(12) United States Patent
Kwon et al.

(10) Patent No.: US 10,822,498 B2
(45) Date of Patent: Nov. 3, 2020

(54) CARBON BLACK DISPERSION SOLUTION AND MANUFACTURING METHOD THEREFOR

(71) Applicant: LG Chem, Ltd., Seoul (KR)

(72) Inventors: Gyemin Kwon, Daejeon (KR); Houngsik Yoo, Daejeon (KR); Hye Lim Sim, Daejeon (KR); Byoung Hoon Ahn, Daejeon (KR); Jong Won Lee, Daejeon (KR); Dong Hyun Kim, Daejeon (KR); Sang Hoon Choy, Daejeon (KR); Hyeon Choi, Daejeon (KR)

(73) Assignee: LG Chem, Ltd. (KR)

( * ) Notice: Subject to any disclaimer, the term of this patent is extended or adjusted under 35 U.S.C. 154(b) by 236 days.

(21) Appl. No.: 15/760,460

(22) PCT Filed: Aug. 26, 2016

(86) PCT No.: PCT/KR2016/009542
§ 371 (c)(1),
(2) Date: Mar. 15, 2018

(87) PCT Pub. No.: WO2017/052086
PCT Pub. Date: Mar. 30, 2017

(65) Prior Publication Data
US 2018/0251638 A1 Sep. 6, 2018

(30) Foreign Application Priority Data
Sep. 25, 2015 (KR) .................. 10-2015-0137076

(51) Int. Cl.
| C09C 1/56 | (2006.01) |
| C09C 1/48 | (2006.01) |
| H01B 1/24 | (2006.01) |
| H01M 4/62 | (2006.01) |
| C08K 3/04 | (2006.01) |
| C08L 15/00 | (2006.01) |
| C09C 3/10 | (2006.01) |

(52) U.S. Cl.
CPC .................. *C09C 1/56* (2013.01); *C08K 3/04* (2013.01); *C08L 15/005* (2013.01); *C09C 1/48* (2013.01); *C09C 3/10* (2013.01); *H01B 1/24* (2013.01); *H01M 4/62* (2013.01); *H01M 4/622* (2013.01); *H01M 4/625* (2013.01); *C01P 2004/51* (2013.01)

(58) Field of Classification Search
None
See application file for complete search history.

(56) References Cited

U.S. PATENT DOCUMENTS

| 2003/0054243 | A1* | 3/2003 | Suzuki | ............... H01M 4/13 429/188 |
| 2012/0037853 | A1 | 2/2012 | Unagami et al. | |
| 2012/0101196 | A1* | 4/2012 | Sakamoto | ............... C08K 5/18 524/89 |
| 2012/0241689 | A1* | 9/2012 | Itou | ............... H05K 1/0373 252/511 |
| 2013/0244098 | A1 | 9/2013 | Voillequin et al. | |
| 2014/0000488 | A1 | 1/2014 | Sekiyama et al. | |
| 2015/0322254 | A1* | 11/2015 | Tsukada | ............... C08L 1/02 524/35 |

FOREIGN PATENT DOCUMENTS

| JP | H7268268 A | 10/1995 |
| JP | 2011070908 A | 4/2011 |
| JP | 2011184664 A | 9/2011 |
| JP | 5533057 B2 | 6/2014 |
| JP | 5672451 B2 | 2/2015 |
| KR | 20120028860 A | 3/2012 |
| KR | 20150016852 A | 2/2015 |
| KR | 20150095413 A | 8/2015 |

OTHER PUBLICATIONS

Alcock, Ben et al. "The mechanical properties of a model hydrogenated nitrile butadiene rubber (HNBR) following simulated sweet oil exposure at elevated temperature and pressure" Polymer Testing 46 (Jun. 25, 2015) pp. 50-58.*
Liu, Guangyong et al. "Quantative exploration of the swelling response for carbon black filled hydrogenated nitrile rubber with three-dimensional solubility parameters" Polymer Bulletin 72 (Apr. 17, 2015) pp. 1961-1974.*
Search report from International Application No. PCT/KR2016/009542, dated Nov. 1, 2016.
Alcock, B., et al., "The mechanical properties of a model hydrogenated nitrile butadiene rubber (HNBR) following simulated sweet oil exposure at elevated temperature and pressure", Polymer Testing, Jun. 25, 2015, vol. 46, pp. 50-58, XP055486305.
Extended European Search Report including Written Opinion for Application No. EP16848812.0 dated Jul. 4, 2018.
Guangyong Liu et al., "Quantitative exploration of the swelling response for carbon black filled hydrogenated nitrile rubber with three-dimensional solubility parameters", Polymer Bulletin, Apr. 17, 2015, vol. 72, No. 8, pp. 1961-1974, XP035521257.

* cited by examiner

*Primary Examiner* — Colleen P Dunn
*Assistant Examiner* — Ross J Christie
(74) *Attorney, Agent, or Firm* — Lerner, David, Littenberg, Krumholz & Mentlik, LLP

(57) ABSTRACT

The present disclosure relates to a carbon black dispersion solution comprising carbon black, a dispersion medium, and partially hydrogenated nitrile rubber having a residual double bond (RDB) value of 0.5% by weight to 40% by weight calculated according to the following Mathematical Formula 1, wherein dispersed particle diameters of the carbon black have particle size distribution $D_{50}$ of 0.1 μm to 2 μm, a method for preparing the same, and methods for preparing electrode slurry and an electrode using the same.

11 Claims, No Drawings

CARBON BLACK DISPERSION SOLUTION AND MANUFACTURING METHOD THEREFOR

CROSS-REFERENCE TO RELATED APPLICATIONS

The present application is a national phase entry under 35 U.S.C. § 371 of International Application No. PCT/KR2016/009542 filed Aug. 26, 2016, which claims priority from Korean Patent Application No. 10-2015-0137076, filed with the Korean Intellectual Property Office on September 25, 2015, the entire contents of which are incorporated herein by reference.

TECHNICAL FIELD

The present disclosure relates to a carbon black dispersion solution in which carbon black is uniformly dispersed into a dispersion medium, a method for preparing the same, and methods for preparing electrode slurry and an electrode using the same.

BACKGROUND ART

Carbon black has been used in various technology fields as materials for coloring, shielding or conducting, and in order to satisfy conditions required in various applications, finely dispersing carbon black in a solvent has become important.

Meanwhile, demands for loading batteries that are small and light but have high capacity in electronic devices has recently increased. In addition, enhancement in the performance such as high output and high capacity has been continuously required for large secondary batteries used in automotive applications. Development of secondary batteries has been actively progressed in order to meet such requirements. An electrode of a secondary battery is commonly formed by coating slurry comprising an electrode active material, a binder resin and a conductor on a surface of a current collector. The conductor is capable of enhancing conductivity of the whole electrode by forming a conductive channel in the electrode, and is capable of increasing charge and discharge rates. Herein, carbon black may be added as the conductor.

Carbon black has a large specific surface area and thereby has strong cohesion, and is difficult to be uniformly dispersed in slurry for forming an electrode. When dispersibility of carbon black is insufficient, a uniform conducting network is not formed, and therefore, a decrease in the internal resistance of an electrode is not sufficiently achieved, and resistance distribution is produced inside the electrode due to partial aggregation resulting in current localization when using a battery, and as a result, partial heating or degradation may occur. In addition, when charge and discharge are repeated, interfacial adhesion between a current collector and an electrode layer, or between an active material and carbon black becomes poor causing battery performance decline, and when carbon black dispersibility is insufficient, such interfacial adhesion worsening may become more serious. Carbon black with enhanced conductivity has a highly developed structure compared to existing carbon black, and therefore, has small primary particle sizes and a large surface area readily forming an aggregate, and is not more readily dispersed due to high oil absorption.

For carbon black dispersion, methods using various additives, for example, dispersants such as surfactants or pigment dispersing resins have been tried. However, methods of using surfactants are advantageous for dispersion in water-based systems, but are not suitable for dispersion in organic solvents. When using pigment dispersing resins, there is a problem in that carbon black readily reaggregates, or stabilization over time decreases. In addition, when preparing a battery electrode, sufficient dispersibility may not be obtained when the added surfactant or pigment-dispersing resin amount is small, and when increasing the added surfactant or pigment-dispersing resin amount for obtaining sufficient dispersibility, the content of an electrode active material decreases causing a battery capacity decrease.

Methods of oxidation treating carbon black in a vapor or liquid phase to introduce acidic functional groups on the particle surface have been tried, however, there is a problem in that treatment efficiency is low or treatment equipment is high priced in a vapor phase oxidation such as plasma or ozone treatment, and in a liquid phase treatment, there is a problem in terms of work safety since strong acids such as acetic acid or hydrogen peroxide are used.

In addition, methods of adding a vinyl pyrrolidone-based resin have been tried for enhancing carbon black dispersibility. However, moisture is readily comprised inside electrode slurry or electrode film due to hygroscopicity of the vinyl pyrrolidone-based resin, and active materials may be degraded.

DISCLOSURE

Technical Problem

The present disclosure is directed to providing a carbon black dispersion solution in which carbon black is uniformly dispersed into a dispersion medium, a method for preparing the same, and methods for preparing electrode slurry and an electrode using the same.

Technical Solution

One embodiment of the present application provides a carbon black dispersion solution comprising carbon black, a dispersion medium, and partially hydrogenated nitrile rubber having a residual double bond (RDB) value of 0.5% by weight to 40% by weight calculated according to the following Mathematical Formula 1, wherein dispersed particle diameters of the carbon black have particle size distribution $D_{50}$ of 0.1 µm to 2 µm.

$$\text{RDB (\% by weight)} = BD \text{ weight}/(BD \text{ weight} + HBD \text{ weight}) \times 100 \quad \text{[Mathematical Formula 1]}$$

In Mathematical Formula 1, BD means a conjugated diene-derived structure unit and HBD means a hydrogenated conjugated diene-derived structure unit.

The carbon black dispersion solution according to embodiments described in the present specification is a solution dispersing carbon black, and, together with a dispersion medium and carbon black, comprises partially hydrogenated nitrile rubber having a residual double bond value in a specific range as a main component so as to disperse the carbon black. In an electrode slurry stage comprising an electrode active material, carbon black may not be efficiently dispersed. The embodiment relates to a dispersion solution separately dispersing carbon black before mixing the carbon black to electrode slurry, and components comprised in this dispersion solution, particularly, partially hydrogenated nitrile rubber, are distinguished from components comprised in the electrode slurry.

According to another embodiment of the present application, the partially hydrogenated nitrile rubber comprises an α,β-unsaturated nitrile-derived structure unit, a conjugated diene-derived structure unit and a hydrogenated conjugated diene-derived structure unit. Herein, the α,β-unsaturated nitrile-derived structure unit may be comprised in 20% by weight to 50% by weight with respect to the total weight of the rubber.

According to another embodiment of the present application, the carbon black dispersion solution comprises a carbon black complex in which the partially hydrogenated nitrile rubber is introduced to a surface of the carbon black. In the complex, the partially hydrogenated nitrile rubber may be present in a coated form on at least a part of the carbon black surface.

According to another embodiment of the present application, the dispersed particle diameters of the carbon black have particle size distribution such that $D_{50}$ is from 0.1 μm to 2 μm, and $D_{90}$ is 10 μm or less. According to one example, $D_{50}$ may be from 0.5 μm to 2 μm, and specifically, $D_{50}$ may be from 0.5 μm to 1.5 μm. According to one example, $D_{10}$ is from 0.1 μm to 0.4 μm and specifically from 0.2 μm to 0.4 μm. According to one example, $D_{90}$ is from 1 μm to 0.4 μm.

Another embodiment of the present application provides a method for preparing a carbon black dispersion solution comprising mixing carbon black, a dispersion medium, and partially hydrogenated nitrile rubber having a residual double bond (RDB) value of 0.5% by weight to 40% by weight calculated according to Mathematical Formula 1.

Another embodiment of the present application provides a method for preparing electrode slurry comprising mixing the carbon black dispersion solution, an electrode active material and a binder resin.

Another embodiment of the present application provides a method for preparing an electrode comprising preparing electrode slurry by mixing the carbon black dispersion solution, an electrode active material and a binder resin; and forming an electrode using the electrode slurry.

Advantageous Effects

In a carbon black dispersion solution according to embodiments of the present application, carbon black can be uniformly dispersed into a dispersion medium by using partially hydrogenated nitrile-based rubber controlling a content of a structure unit region capable of interacting with carbon black forming a dispersant and a content of a structure unit region capable of interacting with a dispersion medium, and in addition thereto, the carbon black can be dispersed and comprised in a high concentration without concern over an increase in the dispersion solution viscosity.

MODE FOR DISCLOSURE

Hereinafter, the present disclosure will be described in more detail in order to illuminate the present disclosure.

Terms or words used in the present specification and the claims are not to be interpreted limitedly to common or dictionary meanings, and shall be interpreted as meanings and concepts corresponding to technological ideas of the present disclosure based on a principle in which inventors may suitably define the concepts of terms in order to describe their own invention in the best possible way.

A carbon black dispersion solution according to one embodiment of the present application comprises carbon black, a dispersion medium, and partially hydrogenated nitrile rubber having a residual double bond (RDB) value of 0.5% by weight to 40% by weight calculated according to the following Mathematical Formula 1:

$$RDB\ (\%\ by\ weight) = BD\ weight/(BD\ weight + HBD\ weight) \times 100 \quad [\text{Mathematical Formula 1}]$$

In Mathematical Formula 1, BD means a conjugated diene-derived structure unit and HBD means a hydrogenated conjugated diene-derived structure unit.

Partially hydrogenated nitrile rubber having a residual double bond (RDB) value of 0.5% by weight to 40% by weight calculated according to the following Mathematical Formula 1 has a structure comprising a structure unit region (A) capable of interacting with carbon black and a structure unit region (B) capable of interacting with a dispersion medium. Accordingly, when preparing the carbon black dispersion solution using a dispersant, the carbon black is dispersed into the dispersion medium in a complex form physically or chemically binding to the structure unit region (A) of the nitrile rubber capable of interacting with the carbon black. When the nitrile rubber has a residual double bond (RDB) value of 0.5% by weight to 40% by weight calculated according to the following Mathematical Formula 1, miscibility for the dispersion medium increases leading to an increase in the carbon black dispersibility. Particularly, when the residual double bond (RDB) value calculated according to Mathematical Formula 1 is 0.5% by weight or greater, binding with the carbon black surface becomes advantageous through n-n bonds between the carbon black and the partially hydrogenated nitrile rubber, and a dispersion time may be reduced when preparing the dispersion since the carbon black is favorably wetted. In addition, partially hydrogenated nitrile rubber having a residual double bond (RDB) value of 0.5% by weight or greater is readily prepared compared to partially hydrogenated nitrile rubber having a residual double bond (RDB) value of greater than 0% by weight and less than 0.5% by weight. Furthermore, the residual double bond (RDB) value being 40% by weight or less is advantageous in terms of solubility of the partially hydrogenated nitrile rubber for the dispersion medium. The residual double bond (RDB) value may be identified by measuring a supernatant with NMR after centrifuge in the dispersion. According to one embodiment, the RDB value of the nitrile rubber represented by Mathematical Formula 1 is from 0.5% by weight to 35% by weight. According to one preferred embodiment, the RDB value of the nitrile rubber represented by Mathematical Formula 1 is from 0.5% by weight to 20% by weight.

According to another embodiment of the present application, various materials such as commercially available furnace black, channel black, thermal black, acetylene black and ketjen black may be used as the carbon black. In addition, porous carbon black and the like may also be used.

The primary particle diameter of the carbon black may be from 1 nm to 50 nm, for example, from 15 nm to 25 nm. Herein, the primary particle diameter means a particle diameter of the carbon black particles that do not aggregate, and may be measured using an electron microscope such as SEM or TEM, and the like.

According to one example, the carbon black may have a specific surface area of 30 $m^2/g$ to 1,500 $m^2/g$, for example, 30 $m^2/g$ to 380 $m^2/g$, and specifically, 130 $m^2/g$ to 380 $m^2/g$. The specific surface area of the carbon black may be measured using Brunauer-Emmett-Tellery (BET), and specifically, the surface area may be obtained by adsorbing nitrogen gas ($N_2$) on the powder surface, measuring the amount of the adsorbed nitrogen gas, and calculating using a BET equation.

The carbon black may be surface treated using methods known in the art as necessary. For example, impurities may be removed through surface treatment with acetylene gas. As the carbon black, those having purity of 99.5% or higher may be used.

The dispersed particle diameters of the carbon black have particle size distribution such that $D_{50}$ is from 0.1 μm to 2 μm, preferably, $D_{50}$ is from 0.5 μm to 2 μm, and $D_{90}$ is 10 μm or less. According to one example, $D_{50}$ may be from 0.5 μm to 2 μm, and specifically, $D_{50}$ may be from 0.5 μm to 1.5 μm. According to one example, $D_{10}$ is from 0.1 μm to 0.4 μm, and specifically from 0.2 μm to 0.4 μm. According to one example, $D_{90}$ is from 1 μm to 0.4 μm. Herein, Herein, particle size distribution $D_{50}$ may be defined as a particle size at a 50% base in the particle size distribution. In addition, the dispersed particle diameters of the carbon black may be measured using, for example, a laser diffraction method. More specifically, the dispersion in which the carbon black is dispersed is introduced to a commercially available laser diffraction particle size measuring device (for example, Malvern MS300) to calculate an average particle diameter at a 50% base ($D_{50}$) in the particle size distribution. $D_{10}$ and $D_{90}$ mean particle sizes at 10% and 90%, respectively, in the particle size distribution.

According to another embodiment of the present application, the carbon black dispersion solution may have viscosity of 1 Pa·s to 100 Pa·s, specifically 5 Pa·s to 40 Pa·s, and more specifically 5 Pa·s to 15 Pa·s. Viscosity of the dispersion may be measured using a Haake rheometer, and specifically, the viscosity may be measured at a shear of 1.2/s.

According to one embodiment, in the dispersion solution, the carbon black may be comprised in 10% by weight to 30% by weight, and more specifically in 10% by weight to 20% by weight based on the whole dispersion solution (100% by weight), and the partially hydrogenated nitrile rubber may be comprised in 5 parts by weight to 50 parts by weight, specifically in 5 parts by weight to 30 parts by weight and more specifically in 5 parts by weight to 10 parts by weight, with respect to 100 parts by weight of the carbon black. When the carbon black content is 10% by weight or greater, slurry solid occupies over a certain level when preparing the electrode slurry, which is advantageous for electrode coating. Increasing the carbon black content is advantageous in terms of processability, however, the carbon black content being 30% by weight or less prevents dispersion viscosity from rising too high facilitating the preparation into a disperser.

According to another embodiment of the present application, the partially hydrogenated nitrile rubber comprises an α,β-unsaturated nitrile-derived structure unit, a conjugated diene-derived structure unit and a hydrogenated conjugated diene-derived structure unit. The nitrile rubber comprises the α,β-unsaturated nitrile-derived structure unit as a structure unit region (A) capable of interacting with the carbon black; the conjugated diene-derived structure unit and the hydrogenated conjugated diene-derived structure unit as a structure unit region (B) capable of interacting with the dispersion medium. Herein, the partially hydrogenated nitrile rubber may selectively further comprise an additional co-monomer copolymerizable under a condition that the carbon black has the above-mentioned particle size distribution.

The partially hydrogenated nitrile rubber may be prepared by copolymerizing α,β-unsaturated nitrile, conjugated diene and, selectively, other copolymerizable co-monomers, and then hydrogenating C=C double bonds in the copolymer.

Herein, the polymerization reaction process and the hydrogenation process may be carried out using common methods.

Specific examples of the α,β-unsaturated nitrile capable of being used when preparing the partially hydrogenated nitrile rubber may comprise acrylonitrile, methacrylonitrile or the like, and among these, one type alone or a mixture of two or more types may be used.

Specific examples of the conjugated diene capable of being used when preparing the partially hydrogenated nitrile rubber may comprise conjugated diene having 4 to 6 carbon atoms such as 1,3-butadiene, isoprene or 2,3-methylbutadiene, and any one or a mixture of two or more thereof may be used.

In addition, specific examples of the other copolymerizable co-monomers capable of being selectively used may comprise aromatic vinyl monomers (for example, styrene, α-methylstyrene, vinylpyridine, fluoroethyl vinyl ether or the like), α,β-unsaturated carboxylic acids (for example, acrylic acid, methacrylic acid, maleic acid, fumaric acid or the like), esters or amides of α,β-unsaturated carboxylic acids (for example, methyl (meth)acrylate, ethyl (meth)acrylate, n-dodecyl (meth)acrylate, methoxymethyl (meth)acrylate, hydroxyethyl (meth)acrylate, polyethylene glycol (meth)acrylate or the like), anhydrides of α,β-unsaturated dicarboxylic acids (for example, maleic anhydride, itaconic anhydride, citraconic anhydride or the like), but are not limited thereto.

According to one embodiment, the partially hydrogenated nitrile rubber further comprises (meth)acrylate-based monomer as the co-monomer. Examples of the (meth)acrylate-based monomer comprise methyl acrylate, ethyl acrylate, propyl acrylate, isopropyl acrylate, n-butyl acrylate, isobutyl acrylate, n-amyl acrylate, isoamyl acrylate, n-ethylhexyl acrylate, 2-ethylhexyl acrylate, 2-hydroxyethyl acrylate, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, n-ethylhexyl methacrylate, 2-ethylhexyl methacrylate, 2-hydroxyethyl methacrylate, hydroxypropyl methacrylate and the like.

In the partially hydrogenated nitrile rubber prepared using a method such as above, a content ratio of the α,β-unsaturated nitrile-derived structure unit, the conjugated diene-derived structure unit, the hydrogenated conjugated diene-derived structure unit and, selectively, the other copolymerizable co-monomer-derived structure unit may vary in a wide range, and in each case, the total sum of the structure units becomes 100% by weight.

Specifically, when considering dispersibility enhancement for the carbon black and miscibility with the dispersion medium, the content of the α,β-unsaturated nitrile-derived structure unit in the partially hydrogenated nitrile rubber may be from 20% by weight to 50% by weight and specifically from 25% by weight to 50% by weight with respect to the total weight of the partially hydrogenated nitrile rubber. When comprising the α,β-unsaturated nitrile structure-containing repeating unit in the above-mentioned content range, dispersibility of the carbon black may increase and high conductivity may be provided even when the added amount of the carbon black is small.

In the present disclosure, the nitrile structure-containing repeating unit in the partially hydrogenated nitrile rubber is a weight ratio of the structure unit derived from the α,β-unsaturated nitrile with respect to the whole rubber, and the corresponding content is a median value obtained by measuring the produced nitrogen amount in accordance with a mill oven method of JIS K 6364, converting the amount of binding amount thereof from the acrylonitrile molecular weight, and quantizing.

In addition, when further comprising the other copolymerizable co-monomers, the content ratio may vary depending on the type and the properties of the co-monomer, and specifically, the content of the co-monomer-derived structure unit may be 40% by weight or less and more specifically from 20% by weight to 40% by weight with respect to the total weight of the partially hydrogenated nitrile-based rubber. In this case, the conjugated diene and/or the α,β-unsaturated nitrile of the corresponding ratios are substituted with additional monomers with such ratios, and herein, the ratios of all the monomers become 100% by weight in each case.

According to one embodiment, the partially hydrogenated nitrile rubber comprises a unit of the following Chemical Formula 1, a unit of the following Chemical Formula 2 and a unit of the following Chemical Formula 3.

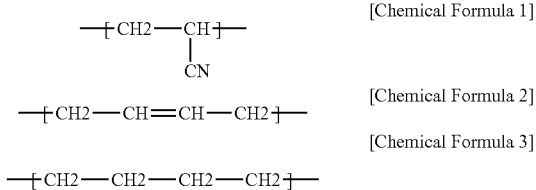

Herein, the content of the acrylonitrile-derived structure unit represented by Chemical Formula 1 may be, for example, from 20% by weight to 50% by weight and specifically from 20% by weight to 40% by weight with respect to the total weight of the rubber.

The content of the unit represented by Chemical Formula 2 may be from 0.1% by weight to 40% by weight and specifically from 0.1% by weight to 25% by weight with respect to the total weight of the rubber.

The content of the unit represented by Chemical Formula 3 may be from 20% by weight to 70% by weight and specifically from 40% by weight to 70% by weight with respect to the total weight of the rubber.

According to one embodiment, the partially hydrogenated nitrile rubber may have a weight average molecular weight of 10,000 g/mol to 700,000 g/mol and more specifically 10,000 g/mol to 300,000 g/mol. In addition, the partially hydrogenated nitrile rubber may have a polydispersity index PDI (ratio of Mw/Mn, Mw is a weight average molecular weight and Mn is a number average molecular weight) in a range of 2 to 6 and preferably in a range of 2 to 4. When the nitrile rubber has a weight average molecular weight and a polydispersity index in the above-mentioned ranges, the carbon black may be uniformly dispersed into the dispersion medium. In the present disclosure, the weight average molecular weight and the number average molecular weight are a polystyrene conversion molecular weight analyzed by gel permeation chromatography (GPC). The molecular weight being less than a certain level prevents dispersion solution viscosity from rising too high, which is advantageous in terms of processability when preparing the dispersion solution using a disperser.

In addition, the partially hydrogenated nitrile rubber may have Mooney viscosity (ML 1+4 at 100° C.) of 10 to 120 and more specifically 10 to 100. In the present disclosure, Mooney viscosity of the partially hydrogenated nitrile rubber may be measured in accordance with ASTM standard D 1646. High Mooney viscosity is considered to have a high molecular weight.

According to one embodiment of the present application, the dispersion medium may be an organic solvent comprising any one, or two or more heteroatoms selected from the group consisting of a nitrogen atom (N) and an oxygen atom (O) having an unshared electron pair.

Specific examples of the dispersion medium may comprise amide-based polar organic solvents such as dimethylformamide (DMF), diethylformamide, dimethylacetamide (DMAc) or N-methyl pyrrolidone (NMP); alcohols such as methanol, ethanol, 1-propanol, 2-propanol (isopropyl alcohol), 1-butanol (n-butanol), 2-methyl-1-propanol (isobutanol), 2-butanol (sec-butanol), 1-methyl-2-propanol (tert-butanol), pentanol, hexanol, heptanol or octanol; glycols such as ethylene glycol, diethylene glycol, triethylene glycol, propylene glycol, 1,3-propanediol, 1,3-butanediol, 1,5-pentanediol or hexylene glycol; polyalcohols such as glycerin, trimethylolpropane, pentaerythritol or sorbitol; glycol ethers such as ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether or tetraethylene glycol monobutyl ether; ketons such as acetone, methyl ethyl ketone, methyl propyl ketone or cyclopentanone; esters such as ethyl acetate, γ-butyrolactone, or ε-propiolactone, and any one, or a mixture of two or more thereof may be used.

The content of the carbon black, the dispersion medium and the partially hydrogenated nitrile rubber may be properly determined depending on the application of the dispersion solution.

According to one embodiment, for uniformly dispersing the carbon black into the dispersion solution, the partially hydrogenated nitrile rubber may be comprised in 5 parts by weight to 50 parts by weight with respect to 100 parts by weight of the carbon black. The partially hydrogenated nitrile rubber content being 5 parts by weight or greater is advantageous in uniformly dispersing the carbon black, and the content being 50 parts by weight or less is advantageous in terms of processability by preventing an excessive increase in the dispersion solution viscosity.

According to one embodiment, the content of the whole solute comprising the carbon black and the dispersant is from 1% by weight to 50% by weight and preferably from 10% by weight to 45% by weight, and the content of the dispersion medium may be from 50% by weight to 99% by weight and preferably from 55% by weight to 90% by weight. In addition, the content of the carbon black is from 50% by weight to 90% by weight and the content of the partially hydrogenated nitrile rubber may be from 10% by weight to 50% by weight in the whole solute. In the above-mentioned range, the carbon black may be uniformly dispersed into the solvent.

The carbon black dispersion solution according to the embodiments described above may be prepared using a preparation method comprising mixing carbon black, a dispersion medium and the partially hydrogenated nitrile rubber described above. For example, the carbon black dispersion solution may be prepared by adding carbon black to a dispersion medium in which the partially hydrogenated nitrile rubber is dissolved, adding carbon black to a dispersion medium and then dissolving the partially hydrogenated nitrile rubber therein, or adding and mixing carbon black and the partially hydrogenated nitrile rubber to a dispersion medium.

According to one embodiment, the carbon black dispersion may be prepared using a method comprising preparing carbon black slurry by mixing carbon black and a dispersion medium (Step 1); and mixing partially hydrogenated nitrile rubber having a residual double bond (RDB) value of 0.5% by weight to 40% by weight calculated according to Mathematical Formula 1 to the carbon black slurry (Step 2).

Hereinafter, each step will be described in detail.

Step 1 for preparing the carbon black dispersion solution is a step of preparing carbon black slurry by mixing carbon black and a dispersion medium. Herein, types and the used amounts of the carbon black and the dispersion medium are the same as described above.

Mixing of the carbon black and the dispersion medium may be carried out using common mixing methods, specifically, using a mixing apparatus such as a homogenizer, a beads mill, a ball mill, a basket mill, an attrition mill, an all-round stirrer, a clear mixer or a TK mixer.

In addition, when mixing the carbon black and the dispersion medium, a cavitation dispersion treatment may be carried out for enhancing miscibility of the carbon black and the dispersion medium, or increasing dispersibility of the carbon black in the dispersion medium. The cavitation dispersion treatment is a dispersion treatment method using shock waves generated by the rupture of vacuum bubbles produced in water when high energy is applied to a liquid, and the carbon black may be dispersed using the method without damaging properties thereof. Specifically, the cavitation dispersion treatment may be carried out by an ultrasonic wave, a jet mill or a shear dispersion treatment.

The dispersion treatment process may be properly carried out depending on the amount of the carbon black and the type of the dispersant.

Specifically, when the ultrasonic treatment is carried out, the frequency may be in a range of 10 kHz to 150 kHz, the amplitude may be in a range of 5 μm to 100 μm, and the irradiation time may be from 1 minute to 300 minutes. As an ultrasonic wave generator for carrying out the ultrasonic treatment process, an ultrasonic homogenizer and the like may be used for example. In addition, when carrying the jet mill treatment, the pressure may be from 20 MPa to 250 MPa, and the treatment may be carried out one time or more, specifically, for a plurality of times of two times or more. In addition, as the jet mill dispersion apparatus, a high pressure wet jet mill and the like may be used.

The temperature when carrying out the cavitation dispersion treatment process is not particularly limited, however, the treatment may be carried out under a temperature causing no concern over changes in the dispersion viscosity caused by evaporation of the dispersion medium. Specifically, the treatment may be carried out at a temperature of 50° C. or lower and more specifically at a temperature of 15° C. to 50° C.

In addition, Step 2 for preparing the carbon black dispersion solution according to one embodiment of the present disclosure is a step of mixing the partially hydrogenated nitrile rubber to the carbon black slurry prepared in Step 1. Herein, the type and the used amount of the partially hydrogenated nitrile rubber are the same as described above.

The mixing process may be carried out using common mixing or dispersion methods, and specifically, may be carried out using a milling method such as a ball mill, a bead mill or a basket mill, or using a homogenizer, a beads mill, a ball mill, a basket mill, an attrition mill, an all-round stirrer, a clear mixer or a TK mixer. More specifically, a milling method using a bead mill may be used. Herein, the size of the bead mill may be properly determined depending on the type and the amount of the carbon black, and the type of the partially hydrogenated nitrile rubber, and specifically, the diameter of the bead mill may be from 0.5 mm to 2 mm.

Using the preparation method as above, the dispersion solution in which the carbon black is uniformly dispersed into the dispersion medium may be prepared.

Specifically, in the carbon black dispersion solution according to embodiments of the present disclosure, the carbon black and the partially hydrogenated nitrile rubber are dispersed and comprised in a carbon black-dispersant complex form by being introduced to the carbon black surface through physically or chemically binding on the carbon black surface. Specifically, the dispersed particle diameters of the carbon black have particle size distribution such that $D_{50}$ is from 0.1 μm to 2 μm, and $D_{90}$ is 10 μm or less.

Accordingly, the carbon black dispersion solution according to the present disclosure may exhibit more superior electric, thermal and mechanical properties due to uniform dispersion of the carbon black, and workability is enhanced as well by maintaining low viscosity, and as a result, application and commercialization in various fields may be accomplished.

Another embodiment of the present application provides a method for preparing electrode slurry comprising mixing the carbon black dispersion solution, an electrode active material and a binder resin.

Another embodiment of the present application provides a method for preparing an electrode comprising preparing electrode slurry by mixing the carbon black dispersion solution, an electrode active material and a binder resin; and forming an electrode using the electrode slurry.

As the preparation methods and the materials such as an electrode active material and a binder resin of the electrode slurry and the electrode, those known in the art may be used. For example, PVDF and the like may be used as the binder resin. While the binder resin such as PVDF in the electrode slurry is used for adhering a metal thin film and an electrode active material, the partially hydrogenated nitrile rubber in the carbon black dispersion solution described above is for dispersing the carbon black before mixing with the electrode active material. The binder resin in the electrode slurry to which an electrode active material is already added may not perform a role of dispersing the carbon black, and therefore, the binder resin in the electrode slurry and the partially hydrogenated nitrile resin in the carbon black dispersion solution are distinguished.

The forming of an electrode may be carried out by coating the slurry on a current collector, and drying or curing the result as necessary.

Another embodiment of the present application provides electrode slurry comprising the carbon black dispersion solution, an electrode active material and a binder resin.

Another embodiment of the present application provides an electrode prepared using electrode slurry comprising the carbon black dispersion solution, an electrode active material and a binder resin, and a secondary battery comprising this electrode. The electrode being prepared using electrode slurry means comprising the electrode slurry, dried matters thereof or cured materials thereof.

The secondary battery comprises a positive electrode, a negative electrode and an electrolyte, and at least one of the positive electrode and the negative electrode may be prepared using electrode slurry comprising the carbon black dispersion solution. The battery may further comprise a separator provided between the positive electrode and the negative electrode as necessary.

The secondary battery may be a lithium ion secondary battery.

Hereinafter, examples of the present disclosure will be described in detail so that those having common knowledge in the technology field to which the present disclosure belongs may readily implement the present disclosure. However, the present disclosure may be embodied in various different forms and is not limited to the examples described herein.

EXAMPLES 1 TO 8 AND COMPARATIVE EXAMPLES 1 TO 5

To an N-methylpyrrolidone (NMP) solvent, carbon black (FX-35 manufactured by Denka Company Limited, primary particle diameter 23 nm and specific surface area BET 135 m$^2$/g) and partially hydrogenated nitrile rubber of the following Table 1 were mixed in a content as shown in the following Table 2 for 1 hour in a wet process using a homo-mixer to prepare a carbon black dispersion solution. % by weight in Table 1 is based on 100% by weight of the partially hydrogenated nitrile rubber, and % by weight in Table 2 is based on 100% by weight of the carbon black dispersion solution. Herein, a beads mill was used. Dispersed particle diameters and viscosity of the prepared dispersions were measured and shown in the following Table 3.

A weight average molecular weight of the partially hydrogenated nitrile rubber was measured using gel permeation chromatography (GPC) under the following condition. When measuring the molecular weight, DMF was used as a solvent. In the dispersion solution state, a molecular weight of the supernatant may be measured after centrifuge, and in electrode and battery states, the electrode was scratched and partially hydrogenated nitrile rubber was extracted using THF to measure the molecular weight.

Apparatus: Alliance 2695 manufactured by Waters
Detector: Viscotek TDA 302 RID manufactured by Malvern
Column: use two PLgel Olexis and one PLgel mixed C manufactured by Agilent
Solvent: THF
Column temperature: 40° C.
Flow rate: 1 ml/min
Sample concentration: 1 mg/mL, 100 μL injection
Standard sample: polystyrene (Mp: 3900000, 723000, 316500, 70950, 31400, 8450, 3940, 485)

As the analysis program, OmmiSEC of Malvern was used, and after obtaining a weight average molecular weight (Mw) and a number average molecular weight (Mn) using GPC, molecular weight distribution (PDI) was calculated from the weight average molecular weight/number average molecular weight (Mw/Mn).

In order to prepare electrode slurry (solid 100 parts by weight), the carbon black dispersion solution prepared above was mixed with 97.35 parts by weight of a ternary positive electrode active material and 1 part by weight of a PVdF-based binder. Herein, the carbon black and the partially hydrogenated nitrile rubber were present in 1.5 parts by weight and 0.15 parts by weight, respectively. Subsequently, the electrode slurry was coated on an aluminum current collector, and the result was rolled using a roll press to prepare a positive electrode polar plate (mix density 3.3 g/cc).

Meanwhile, negative electrode slurry comprising 97.3 parts by weight of a negative electrode active material, 0.7 parts by weight of a conductor, 1 part by weight of a viscosity agent (CMC) and 1 part by weight of a binder (SBR) was coated on a copper current collector, and the result was rolled to prepare a negative electrode polar plate having mix density of 1.6 g/cc.

A monocell was manufactured using the positive electrode and the negative electrode using the dispersion solution prepared above. Specifically, a polyethylene separator was placed between the negative electrode polar plate and the positive electrode polar plate, the result was introduced to a battery case, and then a liquid electrolyte was injected thereto to manufacture a battery. Herein, as the liquid electrolyte, a 1.0 M LiPF$_6$-dissolved mixed solution of ethylene carbonate, ethylmethyl carbonate and diethyl carbonate (1/2/1 volume ratio) was used.

Adhesive Strength Measurement

In order to measure adhesive strength, the positive electrode polar plate (prior to manufacturing a battery) prepared as above was cut to pieces having a same size of 15 mm×150 mm, the pieces were fixed on a slide glass, and peeled off from a current collector to measure 180 degree peel strength. As for the evaluation, peel strength of 5 or more was measured, and the average value was determined. Results of measuring adhesive strength are shown in the following Table 3.

Monocell Evaluation

The battery manufactured above went through 1.0 C/1.0 C charge and discharge for 3 times at room temperature, and SOC was established based on the last discharge capacity. 10 second resistance was measured by applying discharge pulse with 6.5 C at SOC 50.

TABLE 1

| | Partially Hydrogenated Nitrile Rubber Constituent Unit (wt %) | | | | Partially Hydrogenated Nitrile Rubber Properties | | |
|---|---|---|---|---|---|---|---|
| | HBD (Chemical Formula 3) | BD (Chemical Formula 2) | AN (Chemical Formula 1) | BA (Butyl Acrylate) | RDB (%) | MW (×1,000 g/mol) | PDI (Mw/Mn) |
| Example 1 | 54.0 | 9.0 | 37.0 | 0.0 | 14 | 260 | 2.9 |
| Example 2 | 43.9 | 0.3 | 20.9 | 34.9 | 1 | 590 | 6.0 |
| Example 3 | 53.9 | 3.1 | 43.0 | 0.0 | 5 | 220 | 2.5 |
| Example 4 | 43.3 | 22.8 | 33.9 | 0.0 | 34 | 330 | 4.3 |
| Example 5 | 54.0 | 9.0 | 37.0 | 0.0 | 14 | 260 | 2.9 |
| Example 6 | 65.3 | 0.7 | 34.0 | 0.0 | 1 | 220 | 3.1 |
| Example 7 | 65.3 | 0.7 | 34.0 | 0.0 | 1 | 130 | 2.2 |
| Example 8 | 43.9 | 0.3 | 20.9 | 34.9 | 1 | 125 | 2.0 |
| Comparative Example 1 | Not Used | | | | — | — | — |

TABLE 1-continued

|  | Partially Hydrogenated Nitrile Rubber Constituent Unit (wt %) | | | | Partially Hydrogenated Nitrile Rubber Properties | | |
| --- | --- | --- | --- | --- | --- | --- | --- |
|  | HBD (Chemical Formula 3) | BD (Chemical Formula 2) | AN (Chemical Formula 1) | BA (Butyl Acrylate) | RDB (%) | MW (×1,000 g/mol) | PDI (Mw/Mn) |
| Comparative Example 2 | Used Dispersant AFCONA 4570 | | | | — | — | — |
| Comparative Example 3 | 0.0 | 64.8 | 35.2 | 0.0 | 100 | 255 | 4.0 |
| Comparative Example 4 | 28.5 | 37.4 | 34.1 | 0.0 | 57 | 304 | 4.5 |
| Comparative Example 5 | 54.0 | 9.0 | 37.0 | 0.0 | 14 | 260 | 2.9 |

TABLE 2

|  | Dispersion solution Composition (wt %) | | |
| --- | --- | --- | --- |
|  | Carbon Black | Partially Hydrogenated Nitrile Rubber | Dispersion Medium (NMP) |
| Example 1 | 15 | 1.5 | 83.5 |
| Example 2 | 15 | 1.5 | 83.5 |
| Example 3 | 15 | 1.5 | 83.5 |
| Example 4 | 15 | 1.5 | 83.5 |
| Example 5 | 15 | 1.5 | 83.5 |
| Example 6 | 15 | 1.5 | 83.5 |
| Example 7 | 15 | 1.5 | 83.5 |
| Example 8 | 15 | 1.5 | 83.5 |
| Comparative Example 1 | 15 | 0 | 85 |
| Comparative Example 2 | 15 | 1.5 | 83.5 |
| Comparative Example 3 | 15 | 1.5 | 83.5 |
| Comparative Example 4 | 15 | 1.5 | 83.5 |
| Comparative Example 5 | 15 | 1.5 | 83.5 |

Dispersion efficiency at Table 3 is a value representing energy of a beads mill required for particle size distribution $D_{50}$ of the dispersion to reach 1 μm, and a smaller value means having more favorable dispersion efficiency.

Hereinbefore, preferred examples of the present disclosure have been described, however, the scope of a right of the present disclosure is not limited thereto, and various modified and improved forms made by those skilled in the art using the basic concept of the present disclosure defined in the attached claims also belong to the scope of a right of the present disclosure.

The invention claimed is:
1. A carbon black dispersion solution comprising:
    carbon black;
    a dispersion medium; and
    partially hydrogenated nitrile rubber having a residual double bond (RDB) value of 0.5% by weight to 40% by weight calculated according to the following Mathematical Formula 1,
    wherein dispersed particle diameters of the carbon black have particle size distribution $D_{50}$ of 0.1 μm to 2 μm:

RDB (% by weight)=*BD* weight/(*BD* weight+*HBD* weight)×100     [Mathematical Formula 1]

TABLE 3

|  | Dispersion solution Property | | | | | Battery Performance |
| --- | --- | --- | --- | --- | --- | --- |
|  | Dispersed Particle Diameter (μm) | | | Viscosity (@1.2/s) | Dispersion Efficiency | Electrode Adhesion | (DC-IR (ohm)) 6.5 C, 25° C. |
|  | D10 | D50 | D90 | Pa · s | kWh/kg | gf/cm | Discharge SOC 50 |
| Example 1 | 0.31 | 0.98 | 3.07 | 10.0 | 35.7 | 92 | 1.276 |
| Example 2 | 0.37 | 1.04 | 3.00 | 13.0 | 65.3 | 81 | 1.283 |
| Example 3 | 0.32 | 0.94 | 3.09 | 11.0 | 34.3 | 76 | 1.297 |
| Example 4 | 0.31 | 0.91 | 3.01 | 12.0 | 46.5 | 94 | 1.288 |
| Example 5 | 0.21 | 0.53 | 1.29 | 15.0 | 31.2 | 120 | 1.351 |
| Example 6 | 0.32 | 0.97 | 2.91 | 9.5 | 28.4 | 90 | 1.281 |
| Example 7 | 0.31 | 0.95 | 2.62 | 8.2 | 33.1 | 95 | 1.271 |
| Example 8 | 0.36 | 0.97 | 2.93 | 8.5 | 30.3 | 88 | 1.275 |
| Comparative Example 1 | Unable to Secure CNT Wetting (Dispersion solution was not prepared) | | | | | | |
| Comparative Example 2 | Unable to Secure CNT Wetting (Dispersion solution was not prepared) | | | | | | |
| Comparative Example 3 | Unable to Secure CNT Wetting (Dispersion solution was not prepared) | | | | | | |
| Comparative Example 4 | Unable to Secure CNT Wetting (Dispersion solution was not prepared) | | | | | | |
| Comparative Example 5 | 0.57 | 2.23 | 17.50 | 22.0 | — | Electrode Coating Defects Occurred | | in Mathematical Formula 1, BD means a conjugated diene-derived structure unit and HBD means a hydrogenated conjugated diene-derived structure unit, wherein the carbon black is included in 10% by weight to 30% by weight based on a total weight of the dispersion solution, and wherein the partially hydrogenated nitrile rubber is included in 5 parts by weight to 50 parts by weight with respect to 100 parts by weight of the carbon black.

2. The carbon black dispersion solution of claim 1, wherein the partially hydrogenated nitrile rubber comprises an α,β-unsaturated nitrile-derived structure unit, a conjugated diene-derived structure unit and a hydrogenated conjugated diene-derived structure unit.

3. The carbon black dispersion solution of claim 2 comprising the α,β-unsaturated nitrile-derived structure unit in 20% by weight to 50% by weight with respect to a total weight of the rubber.

4. The carbon black dispersion solution of claim 1, comprising a carbon black complex in which the partially hydrogenated nitrile rubber is introduced to a surface of the carbon black.

5. The carbon black dispersion solution of claim 1, wherein the dispersed particle diameters of the carbon black have particle size distribution such that $D_{90}$ is 10 μM or less, and $D_{10}$ is from 0.1 μm to 0.4 μm.

6. The carbon black dispersion solution of claim 1, wherein the partially hydrogenated nitrile rubber comprises a unit of the following Chemical Formula 1, a unit of the following Chemical Formula 2 and a unit of the following Chemical Formula 3:

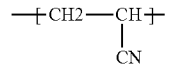
[Chemical Formula 1]

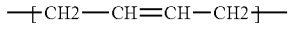
[Chemical Formula 2]

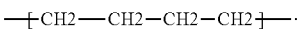
[Chemical Formula 3]

7. The carbon black dispersion solution of claim 1, wherein the partially hydrogenated nitrile rubber has a weight average molecular weight of 10,000 g/mol to 700,000 g/mol.

8. The carbon black dispersion solution of claim 1, wherein the partially hydrogenated nitrile rubber has a polydispersity index PDI (Mw/Mn) ratio of 2 to 6.

9. A method for preparing the carbon black dispersion solution of claim 1 comprising mixing carbon black, a dispersion medium and partially hydrogenated nitrile rubber having a residual double bond (RDB) value of 0.5% by weight to 40% by weight calculated according to Mathematical Formula 1.

10. A method for preparing electrode slurry comprising mixing the carbon black dispersion solution of claim 1, an electrode active material and a binder resin.

11. A method for preparing an electrode comprising:
preparing electrode slurry by mixing the carbon black dispersion solution of claim 1, an electrode active material and a binder resin; and
forming an electrode using the electrode slurry.

* * * * *